UNITED STATES PATENT OFFICE.

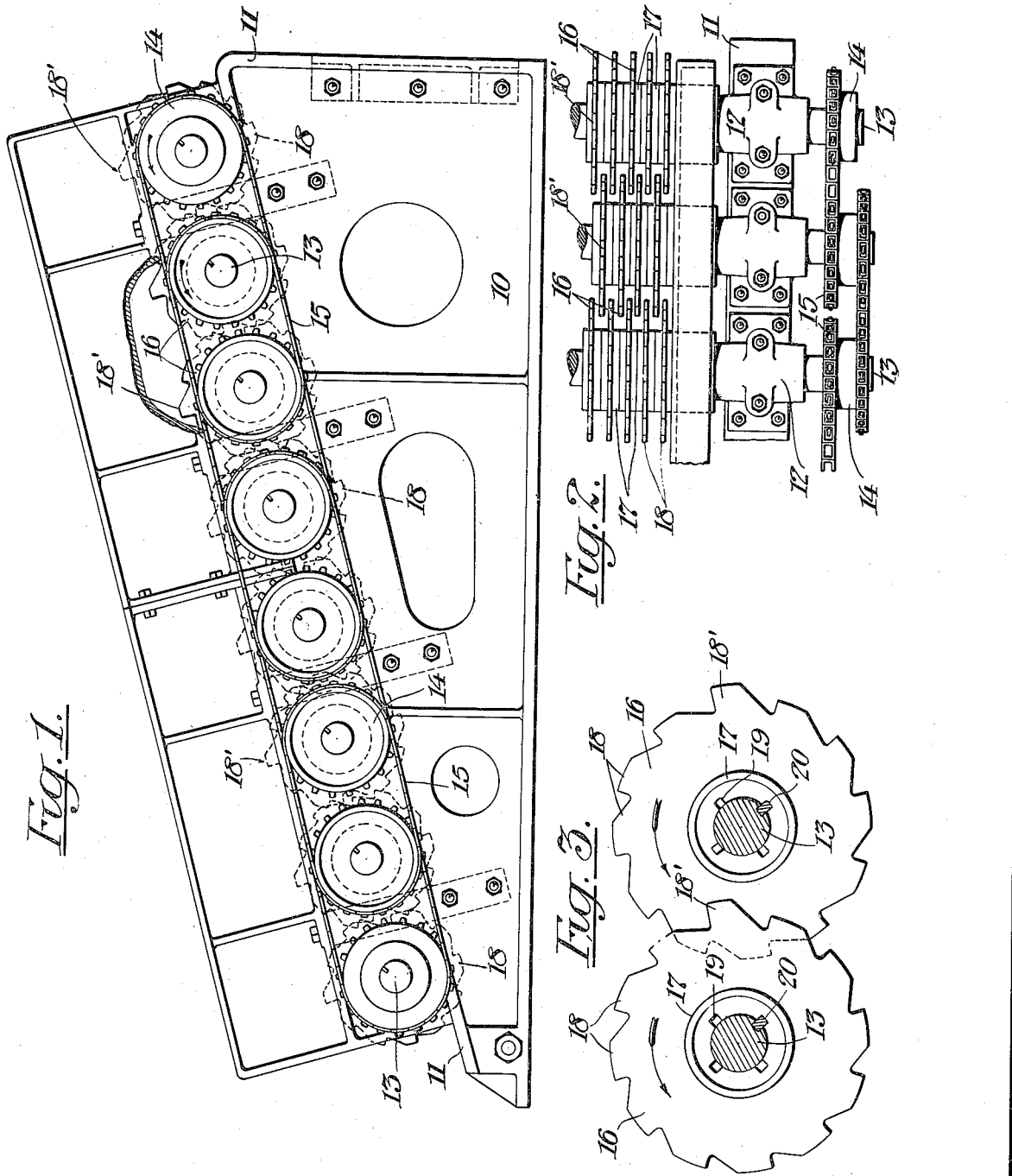

WILEY S. ACKEN, OF JERSEY CITY, NEW JERSEY, ASSIGNOR TO ROBINS CONVEYING BELT COMPANY, A CORPORATION OF NEW JERSEY.

SCREENING APPARATUS.

1,418,899.   Specification of Letters Patent.   Patented June 6, 1922.

Application filed January 28, 1920. Serial No. 354,672.

*To all whom it may concern:*

Be it known that I, WILEY S. ACKEN, a citizen of the United States, and resident of Jersey City, in the county of Hudson and State of New Jersey, have invented certain new and useful Improvements in Screening Apparatus, of which the following is a specification.

This invention relates to screening or separating apparatus for coal, rock, and other similar materials, having reference especially to such apparatus wherein rows of spaced-apart feeding and screening disks are employed.

The object of my invention is to provide a simple, durable and efficient construction whereby all liability of the clogging of material between the opposing peripheral and hub portions of the succeeding disks is obviated; which clogging more frequently occurs when the material under treatment is in a damp or plastic condition.

To this end my invention consists in the novel formation and arrangement of the teeth of the disks as will be hereinafter particularly described and claimed.

In the drawings—

Figure 1 is a side elevation of a screening apparatus embodying my invention, a part of one wall being broken away for clearness.

Fig. 2 is a partial plan of the structure.

Fig. 3 is a transverse section, enlarged, through two adjacent shafts, showing their co-operating feeding and screening disks.

Referring to the drawings, 10 designates a supporting frame having inclined sides 11 provided with boxes 12 in which are journalled transverse shafts 13. These shafts are mounted in spaced parallel relation to each other, their ends at one side of the frame being outwardly extended and provided with sprocket-wheels 14 which are successively connected by chains 15 so as to be simultaneously and continuously driven in the same direction when one of the shafts is actuated from a suitable source of power. The gearing between succeeding shafts is differential in character so as to increase their speed progressively from the uppermost to the lowermost shaft, that is from the receiving to the delivery end of the structure.

Each of the shafts is provided with a plurality of spaced-apart feeding and screening disks 16 having hubs 17 which are keyed or otherwise secured to the shaft so as to rotate with it. The relative arrangement of the disks is such that those on two adjacent shafts are in staggered relation to each other, thus providing narrow spaces between adjacent co-operating disks and enabling the said disks to feed particles of the mass of material from one to the other progressively down the incline of the screen.

The peripheries of the several disks are notched to provide uniformly spaced teeth 18; the distance between the teeth of a row of disks on one shaft and the hubs of the co-operating disks on the adjacent shafts being substantially the distance between the sides of two adjacent disks so as to enable particles generally to pass between the peripheries of the disks on one shaft and the hubs of the co-operating disks on the adjacent shafts.

When the material under treatment is in a damp or plastic condition it frequently becomes clogged in the spaces between the teeth and hubs of the respective opposing disks, and thus interferes with the efficient operation of the apparatus. To overcome this objection I make one or more (preferably one) of the teeth of each disk longer than the others as indicated at 18', so as to rotate in close relation to the hub of the co-operating disk on the adjacent shaft, and I so dispose the disks on each shaft that the long teeth thereof are out of alinement with or in staggered relation to each other, thereby preventing the long teeth of adjacent disks from passing in proximity to the opposing hubs at the same time. The teeth 18' of the respective disks of each shaft thus individually and at different intervals of time, impinge against and break up any material that may cling within or tend to clog the spaces between the peripheries and hubs respectively of the succeeding rows of disks.

Preferably the hub of each disk is provided with a series of spaced key-ways 19 (in the present instance four), any one of which may be applied to the key 20 on the shaft in order to effect the desired location of the long tooth in relation to the corresponding tooth of the adjacent disk on the shaft.

I claim—

A screening apparatus for the purpose described comprising a supporting frame, a plurality of spaced-apart parallel shafts, means for actuating said shafts, and a series of peripherally toothed disks on each of said shafts, each series of disks extending into the spaces between the disks of the adjacent shafts and relatively near to said shafts, each disk having at least one long tooth positioned to turn in close relation to the adjacent shafts and thus break up any material that may tend to clog between the periphery of the disk and an opposing shaft, and the disks of each series being so disposed that the long teeth thereof are out of alinement with each other.

Signed at Birmingham, in the county of Jefferson and State of Alabama this 16th day of Jan., A. D. 1920.

WILEY S. ACKEN.